Oct. 4, 1955 C. W. GREATHEAD 2,719,581

WELDING TORCH

Filed Feb. 13, 1952

INVENTOR.
CLARENCE W. GREATHEAD
BY
ATTORNEY.

United States Patent Office 2,719,581
Patented Oct. 4, 1955

2,719,581

WELDING TORCH

Clarence W. Greathead, Philadelphia, Pa., assignor to Selas Corporation of America, Philadelphia, Pa., a corporation of Pennsylvania Application February 13, 1952, Serial No. 271,306

5 Claims. (Cl. 158—27.4)

The present invention relates to oxyacetylene welding torches, and more particularly to a torch of this type that is particularly adapted for use in the welding of heavy walled pipe.

It is an object of the invention to provide a welding torch to be used with a mixture of oxygen and acetylene as a fuel. It is a further object of the invention to provide a welding torch in which the flame is substantially wedge shaped. A flame of this shape is particularly adapted to melt the adjacent edges of a pipe blank prior to the time the edges are moved together to form the pipe. In such a use, it is necessary that the surface of the edges be melted evenly over their entire area. It is, therefore, a further object of the invention to provide an oxyacetylene torch that is particularly adapted for pipe welding.

The torch of the present invention is provided with a plurality of spaced ports each of which has located adjacent to it, at diametrically spaced points, a pair of smaller ports. The flames from the smaller ports appear to cause the flame from the larger ports to expand near the face of the torch. The flame then narrows in an elongated cone to a point. This arrangement of ports produces a flame of the shape that meets the needs of pipe welding equipment.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 2:
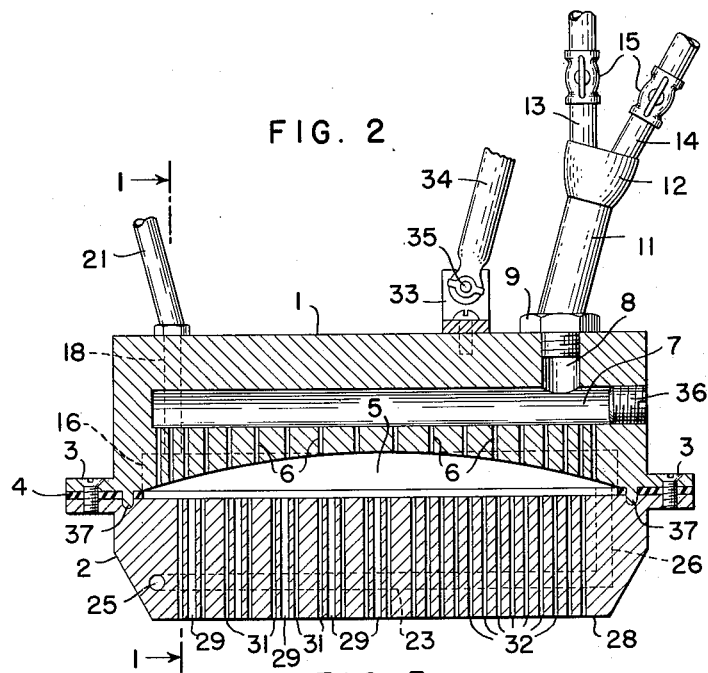
Figure 2 is a longitudinal section of the torch taken on line 2—2 of Figure 1.

Referring to the drawings, it will be seen that the torch is made of two blocks of metal 1 and 2 that are joined together by screws 3 extending through mating flanges formed around their edges. A suitable gasket 4 is placed between the blocks so that the joint between them will be pressure and gas tight. These blocks are preferably of brass or some other material that is easily machined so that the necessary passages can be drilled in them.

The upper block 1 is provided on its lower surface with an elongated and centrally disposed groove 5 that forms a manifold for the discharge ports. This manifold is supplied with fuel through a plurality of small passages 6 that communicate with a supply chamber 7. Fuel is introduced into the chamber 7 through a passage 8 that is provided with a fitting 9 to which is attached a supply pipe 11. The upper end of the supply pipe is provided with a mixing fitting 12 into which fuel in the form of oxygen and acetylene are introduced through pipes 13 and 14 from a suitable source of supply. Each of these pipes is provided with a valve 15 so that the supplies of oxygen and acetylene may be regulated as required.

The block 1 is also provided with passages through which cooling water may be circulated. These passages are shown as channels 16 and 17 respectively that are formed in the lower face of the block, one on each side of and parallel to the manifold 5. Channel 16 is connected by a passage 18 with an inlet pipe 21, and channel 17 is connected by a passage 19 with an outlet pipe 22.

The lower block 2 is provided with a U-shaped passage through which the cooling water flows. This passage includes elongated portions 23 and 24 that extend lengthwise of the block and which join at one end with a cross passage 25. The opposite end of passage 23 is connected with the channel 16 by a passage 26, and the corresponding end of the passage 24 is connected with channel 17 by a passage 27. It will be seen, therefore, that cooling water is introduced through the pipe 21 and flows through passage 18 to channel 16. After passing along the channel, the water will flow through passage 26 to the U-shaped passage and through this passage to passage 27 through which it exhausts into channel 17. The cooling water then flows through channel 17 and passage 19 to the outlet pipe 21. Thus, the entire torch is cooled by circulating water.

Figure 3:
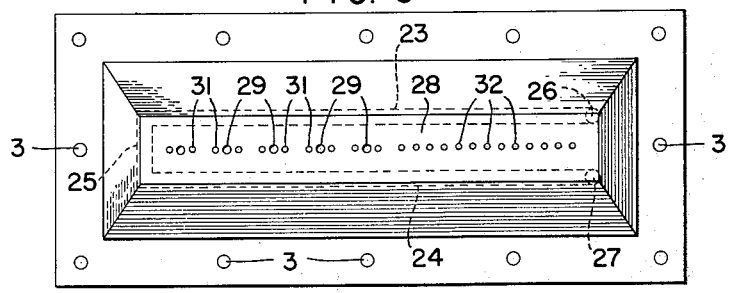
Figure 3 is a bottom view of the torch.
Figure 1:
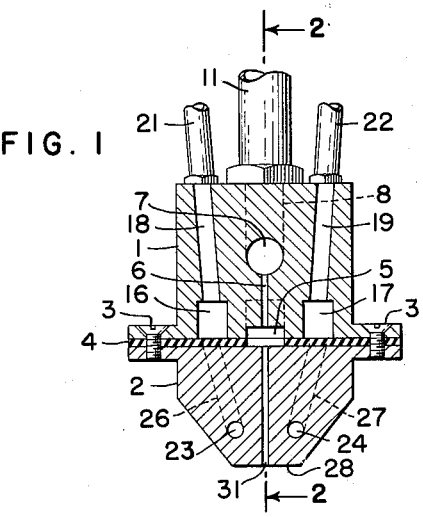
Figure 1 is a section through the torch taken on line 1—1 of Figure 2.

Located centrally between the elongated portions 23 and 24 of the cooling water passage are a number of ports that extend between the manifold 5 and the lower face 28 of the torch. Referring to Figures 2 and 3, it will be seen that the left end of the block 2 is provided with a plurality of ports 29, each of which has disposed on diametrically opposite sides thereof, smaller ports 31. The right end of the block is provided with a row of small ports 32.

The torch is mounted upon a suitable structure by means of a bracket 33 that is attached to the block 2, and a supporting arm 34. The bracket and the arm are connected by a swivel joint 35. It is noted that the various passages for the cooling water are drilled in the block and are plugged up at one end. Such a plug, for example, is shown at 36 as closing the right end of the supply chamber 7. It is also noted that locating pins 37 may be provided on the block to be received in suitable holes in the block 2. These locating pins serve the purpose of aligning the two portions of the torch as well as making sure that they are assembled properly end for end.

Each of the ports 29 is 0.070″ in diameter, while the ports 31 and 32 are 0.028″ in diameter. There have been shown five of the ports 29 and thirteen of the ports 32. This number of ports has been found suitable for welding operations when the material welded is one half inch thick and is moved at a speed of approximately five feet per minute. If the speed of welding was to be increased, the number of ports would of course be increased along with an increase in length of the torch. Oxygen is supplied to the torch under 15 p. s. i. and the acetylene is supplied at 11 p. s. i. with the proper ratio of oxygen and acetylene to get a flame which may be either rich, neutral or lean depending upon the type of metal that is to be welded.

Figure 4:
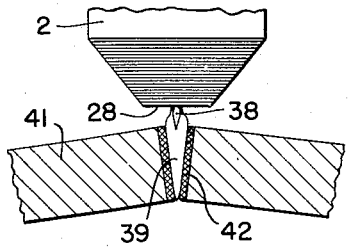
Figure 4 shows the manner in which the flames are formed and the torch is used.

The arrangement of the ports 29 and 31 is such that, with the pressures of the fuel given above, an elongated cone shaped flame of from ⅜″ to 7/16″ will be produced. Apparently, the short flames 38 resulting from the small diameter ports 31 have the effect of causing the large flame 39 produced from ports 29 to assume an inverted conical shape with the large portion of the cone slightly removed from the face 28 of the lower block of the torch as shown in Figure 4.

In the operation of a torch of this type for welding the seam of a pipe, for example, the edges 42 of the pipe which are spaced slightly apart are moved toward the right, relative to the torch in Figures 2 and 3. The large flames 39 produced at the ports 29 will wipe the surface of the blank to melt these surfaces evenly from one edge to the other. The blank is moved relatively to the torch at such a speed that the molten metal forms what is termed a "skin puddle" that is shown at 42. The metal is not melted deep enough for the weight of the fused or liquid metal to overcome its surface tension. Therefore, no metal is lost and the faces to be joined remain smooth. Immediately after passing the torch, the edges of the blank are brought into engagement with each other to form the weld. The movement of the edges of the blank toward each other can take place immediately after they have passed the last one of the large flames 39. The small flames that are produced from the ports 32 merely serve the purpose of keeping the edges of the blank molten until such time as they are moved together mechanically by the apparatus which is used to handle the pipe.

From the above, it will be seen that I have provided a water cooled oxyacetylene torch which is provided with ports so located and sized relative to each other that an elongated conical flame is produced. This flame is particularly adapted because of its shape for melting the edges of a relatively thick piece of metal that is to be used for pipe lengths. It will be apparent, however, that this flame can be used for welding together any two pieces of relatively thick sheet metal. The "skin puddle" that is produced on the surface of the edges to be joined will give a superior weld because all portions of the edges are melted, and none of them are melted to such an extent that dropping of the metal can take place to form voids in the seam. This type of welding, which is accomplished with a flame produced by the torch, does away with the necessity of fluxes and welding rods. Consequently, the welding is considerably cheaper than would otherwise be the case.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention, as set forth in the appended claims, and that in some cases certain features of my invention may be used to advantage without a corresponding use of other features.

What is claimed is:

1. In a welding torch, the combination of an elongated body having an exterior face and a manifold therein, means forming a plurality of passages extending between said manifold and said face, a first group of said passages being of a given diameter and spaced from each other lengthwise of said face, a second group of said passages being of a smaller diameter and being located in pairs closely adjacent to and at diametrically opposite points with respect to each of said first group of passages, the spacing between adjacent smaller diameter passages being greater than the spacing between the smaller diameter passages and the passages of the first group, and means to supply a fuel mixture to said manifold and passages.

2. In an oxyacetylene torch, the combination of an elongated body having a manifold formed therein and an exterior face, means forming a plurality of groups of passages extending between said manifold and said face, each of said groups of passages consisting of a passage of one diameter and a pair of passages of smaller diameter disposed adjacent to and on diametrically opposite sides of said first mentioned passage, said groups of passages being spaced in a row lengthwise of said face, said face being imperforate between said groups of passages, and means through which a mixture of oxygen and acetylene can be supplied to said manifold to flow through said passages and burn at said face.

3. The combination of claim 2 including means forming a passage for a cooling fluid along both sides of said row of groups of passages.

4. In a welding torch, the combination of an elongated block of material having an elongated manifold therein and an elongated exterior face, means forming a row of passages extending lengthwise of said face between said manifold and said face, said passages being in two sections, one of said sections consisting of a plurality of spaced groups of passages each including a passage of a given diameter and a pair of passages of smaller diameter disposed adjacent thereto, the other of said sections including a plurality of equally spaced passages of substantially the same diameter as said pairs of passages, and means to supply a combustible fuel mixture to said manifold.

5. The combination of claim 4 including means to form passages for a cooling fluid on each side of said manifold and on each side of said row of passages.

References Cited in the file of this patent

UNITED STATES PATENTS

| Number | Name | Date |
|---|---|---|
| 1,516,486 | Anderson | Nov. 25, 1924 |
| 1,930,847 | Anderson | Oct. 17, 1933 |
| 1,985,080 | Crowe | Dec. 18, 1934 |
| 2,177,258 | Jares | Oct. 24, 1939 |
| 2,277,472 | Anderson | Mar. 24, 1942 |
| 2,398,884 | Crowe | Apr. 23, 1946 |
| 2,414,874 | Herbst | Jan. 28, 1947 |
| 2,442,437 | Robbins et al. | June 1, 1948 |
| 2,443,101 | Flynn et al. | June 8, 1948 |
| 2,501,724 | Hughey | Mar. 28, 1950 |